(12) United States Patent
Oguro et al.

(10) Patent No.: US 6,447,859 B2
(45) Date of Patent: Sep. 10, 2002

(54) POLYESTER RESIN AND MOLDED ARTICLE

(75) Inventors: Dai Oguro; Koji Yamamoto; Takeo Hayashi; Takeshi Hirokane; Masahiro Kurokawa, all of Kanagawa-ken (JP)

(73) Assignee: Mitsubishi Gas Chemical Company, Inc., Chiyoda-ku (JP)

( * ) Notice: Subject to any disclaimer, the term of this patent is extended or adjusted under 35 U.S.C. 154(b) by 0 days.

(21) Appl. No.: 09/879,100

(22) Filed: Jun. 13, 2001

(30) Foreign Application Priority Data

Jun. 13, 2000 (JP) ........................................ 2000-177070
Oct. 23, 2000 (JP) ........................................ 2000-322673
Dec. 5, 2000 (JP) ........................................ 2000-370580

(51) Int. Cl.$^7$ .......................... B29D 22/00; C08G 63/66
(52) U.S. Cl. ...................... 428/35.7; 528/270; 528/300; 528/307; 528/308.6; 528/403; 528/406; 528/425; 521/50; 428/36.5
(58) Field of Search ............................... 528/272, 300, 528/307, 308.6, 403, 406, 425; 521/50; 428/35.7, 36.5

(56) References Cited

U.S. PATENT DOCUMENTS 2,945,008 A    7/1960   Caldwell et al.

FOREIGN PATENT DOCUMENTS

| DE | 2008984 | 9/1971 |
| JP | 3-130425 | 6/1991 |
| JP | 5-15736 | 3/1993 |
| JP | 5-47575 | 7/1993 |
| JP | 5-69151 | 9/1993 |
| JP | 6-29396 | 4/1994 |
| JP | 7-33899 | 2/1995 |
| JP | 8-231751 | 9/1996 |
| JP | 11-147969 | 6/1999 |
| JP | 11-166067 | 6/1999 |

OTHER PUBLICATIONS

Patent Abstracts of Japan, Publ. No. 62265361, Publ. Date: Nov. 18, 1987.

*Primary Examiner*—Samuel A. Acquah
(74) *Attorney, Agent, or Firm*—Antonelli, Terry, Stout & Kraus, LLP

(57) ABSTRACT

The polyester resin of the present invention is produced by polymerizing a monomer mixture comprising a glycol component containing 5 to 60 mol % of a spiroglycol represented by Formula I:

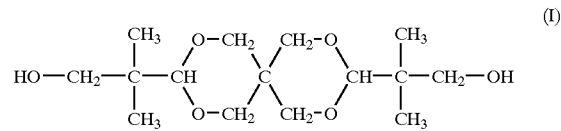

and 30 to 95 mol % of ethylene glycol, and a dicarboxylic acid component containing 80 to 100 mol % of terephthalic acid and/or an ester thereof. The polyester resin has (1): an intrinsic viscosity of 0.4 to 1.5 dL/g, (2) a melt viscosity of 700 to 5,000 Pa·s, (3) a molecular weight distribution of 2.5 to 12.0; and (4) a glass transition temperature of 90° C. or higher and a cooling crystallization exotherm peak of 5 J/g or lower. The polyester resin of the present invention is excellent in heat resistance, transparency, mechanical properties, moldability and fabrication qualities and useful for producing shaped articles such as films, sheets, hollow containers and foamed products.

13 Claims, No Drawings

POLYESTER RESIN AND MOLDED ARTICLE

BACKGROUND OF THE INVENTION

1. Field of the Invention

The present invention relates to a polyester resin, and more particularly to a polyester resin for films, sheets or hollow containers having excellent heat resistance, transparency, mechanical properties, moldability and fabrication qualities, and a molded article produced from the polyester resin.

2. Description of the Prior Art

As well-known in the arts, PET (polyethylene terephthalate) is an industrially valuable polyester because of its superiority in mechanical properties such as tensile strength, elongation and Young's modulus, physical properties such as heat resistance and dimensional stability and chemical properties such as chemical resistance and water resistance, and low costs. For example, PET has been widely used in various applications such as fibers, tire cords, bottles and films. However, when PET is formed into thick sheets, i.e., plates, its high crystallization rate is likely to cause whitening of the plates due to crystallization in the fabrication step, thereby failing to provide transparent plates. To avoid this disadvantage, PET modified with cyclohexane dimethanol, etc. has been used. Also, in the production of PET bottles, expensive germanium oxide has been used as a catalyst to reduce the crystallization rate, or PET modified by copolymerizing a modifying component such as isophthalic acid and cyclohexane dimethanol has been used.

However, the modified PET is less heat-resistant, and therefore, its use in the application requiring a high heat resistance, for example, illumination plates, carports and heat-resistant food containers, is limited.

U.S. Pat. No. 2,945,008 discloses, in Examples 9 and 10, that a diol component (glycol component) comprising ethylene glycol and 3,9-bis(1,1-dimethyl-2-hydroxyethyl)-2,4,8,10-tetraoxaspiro[5.5]undecane (hereinafter occasionally referred to merely as "SPG") represented by Formula I:

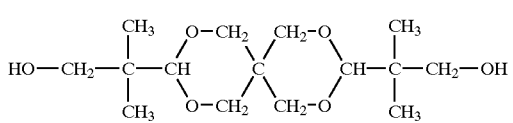

is polymerized with a dicarboxylic acid component comprising dimethyl terephthalate in the presence of a titanium compound catalyst to produce a polyester which melts at 180 to 220° C. The modified PET disclosed therein is expected to show a high heat resistance as compared with non-modified PET because the modified PET contains SPG component having a rigid structure. However, the U.S. Patent does not specify properties of the modified PET such as intrinsic viscosity, molecular weight distribution, melt viscosity, mechanical characteristics and heat resistance. In addition, the modified PET fails to stably show effective moldability and heat resistance or suffers from drastic deterioration in impact resistance, depending upon its chemical composition and properties. Therefore, the modified PET is not necessarily a practically usable molding material.

Japanese Patent Application Laid-Open No. 3-130425 and Japanese Patent Publication Nos. 5-69151 and 6-29396 have proposed to use a polyester produced from a glycol component containing SPG as high shrinkage filament of combined filament yarn composed of different shrinkage filaments, coating agent and adhesive. However, in these prior arts, there is no description concerning molecular weight distribution, melt viscosity and mechanical properties of the modified PET. Since the modified PET fails to stably show an effective heat resistance or suffers from drastic deterioration in impact resistance depending upon its composition and properties, the proposed modified PET is not necessarily a practically usable molding material.

Further, it is extremely difficult to produce a good foamed article by foam-extruding a linear aromatic polyester resin such as polyethylene terephthalate, because the melt thereof is less elasticity and viscous.

To solve the above problems, Japanese Patent Publication No. 5-15736 proposes to foam-extrude a mixture of a linear aromatic polyester resin and a compound having two or more acid anhydride groups per one molecule, and Japanese Patent Publication No. 5-47575 proposes to foam-extrude a mixture of a linear aromatic polyester resin, a compound having two or more acid anhydride groups and a specific metal compound. In addition, Japanese Patent Application Laid-open No. 7-33899 proposes to foam-extrude a polyester having a molecular weight distribution (weight-average molecular weight/number-average molecular weight) of 5.0 to 21.0, and Japanese Patent Application Laid-open No. 11-166067 proposes to foam-extrude a polyester having a Z-average molecular weight of $1 \times 10^6$ or higher and a branching parameter of 0.8 or lower.

In any of the above-described methods, a polyfunctional carboxylic anhydride or a polyfunctional glycidyl compound is added to the polyester resin. If such a polyfunctional compound is added during the production of the polyester resin, the resultant product becomes three-dimensional to make it difficult to take out the product from a reaction vessel. Therefore, the polyfunctional compound or a branched aromatic copolyester resin obtained by copolymerizing the polyfunctional compound with the linear polyester resin must be added during the later extrusion step.

Japanese Patent Application Laid-open No. 8-231751 discloses a foamed article made of an aromatic polyester resin which is produced using a glycol component comprising cyclohexanedimethanol and ethylene glycol. In this method, the crystallization during the foaming process is delayed by the use of the aromatic polyester resin made of two kinds of glycol components, so that the resultant foamed article has uniform, fine closed cells, a high foaming ratio, an excellent heat-insulating property, a high cushioning property, and a good recycling ability. However, the foamed article is still insufficient in the heat resistance and the mechanical strength.

Further, Japanese Patent Application Laid-open No. 11-147969 proposes a foamed article made of an aromatic polyester resin which is produced using a dicarboxylic acid component comprising 2,6-naphthalene dicarboxylic add and terephthalic acid. In the production of the foamed article, when the amount of 2,6-naphthalene dicarboxylic acid is increased to enhance the heat resistance, the production of a satisfactory foamed article having a high closed cell content becomes difficult because of the increased crystallization rate.

SUMMARY OF THE INVENTION

In view of the above problems in the prior art, an object of the present invention is to provide a polyester resin for films, sheets and hollow containers having excellent heat resistance, transparency, mechanical properties, moldability and fabrication qualities. Another object of the present invention is to provide a polyester resin having a high melt viscosity even when produced without any branching agent, and further exhibiting a low intrinsic viscosity, i.e., various excellent properties for producing foamed articles even when polymerized in a short period of time.

As a result of extensive researches in view of the above objects, the inventors have found that a copolyester which is produced by using a limited amount of a specific glycol comonomer and exhibits a specific solution viscosity, melt viscosity and molecular weight distribution is excellent in heat resistance, transparency, mechanical properties and fabrication qualities. The inventors have further found that such a copolyester is excellent suitable as a material for producing foamed articles.

Thus, the present invention provides a polyester resin produced by polymerizing a monomer mixture comprising a glycol component containing 5 to 60 mol % of a glycol (SPG) represented by Formula I:

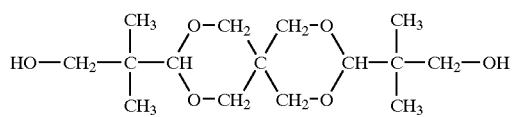

and 30 to 95 mol % of ethylene glycol, and a dicarboxylic acid component containing 80 to 100 mol % of terephthalic acid and/or an ester thereof; the polyester resin satisfying the following requirements (1) to (4):

(1) an intrinsic viscosity of 0.4 to 1.5 dL/g when measured at 25° C. in a 6/4 by mass mixed solvent of phenol/1,1,2,2-tetrachloroethane;

(2) a melt viscosity of 700 to 5,000 Pa·s when measured at 240° C. under a shear rate of 100 s$^{-1}$;

(3) a molecular weight distribution of 2.5 to 12.0; and (4) a glass transition temperature of 90° C. or higher, and a cooling crystallization exotherm peak of 5 J/g or lower, when measured by a differential scanning calorimeter.

The present invention further provides a molded article produced from the polyester resin.

DETAILED DESCRIPTION OF THE INVENTION

The polyester resin of the present invention is produced by polymerizing a monomer mixture comprising a glycol component (diol component) containing 5 to 60 mol % of SPG represented by Formula I and 30 to 95 mol % of ethylene glycol, and a dicarboxylic acid component containing 80 to 100 mol % of terephthalic acid and/or an ester thereof. Examples of the terephthalic acid esters include dimethyl terephthalate, diethyl terephthalate, dipropyl terephthalate, diisopropyl terephthalate, dibutyl terephthalate, dicyclohexyl terephthalate, etc. With the use of SPG represented by Formula I in the above range, the resultant polyester resin simultaneously exhibits excellent heat resistance, solvent resistance, transparency, moldability, mechanical properties and fabrication qualities.

Preferably, the polyester resin of the present invention is produced by polymerizing a monomer mixture comprising a diol component containing 20 to 40 mol % of SPG represented by Formula I and 50 to 80 mol % of ethylene glycol, and a dicarboxylic acid component containing 95 to 100 mol % of terephthahic acid and/or an ester thereof. By regulating the contents of the glycol component and the dicarboxylic acid component within the above ranges, the heat resistance and the mechanical properties can be further enhanced.

The polyester resin particularly suitable for the production of foamed articles is produced by polymerizing a monomer mixture comprising a glycol component containing 15 to 60 mol % of SPG represented by Formula I and 40 to 85 mol % of ethylene glycol, and a dicarboxylic acid component containing 90 to 100 mol % of terephthalic acid and/or an ester thereof.

In the present invention, the dicarboxylic acid component may contain a dicarboxylic acid other than terephthahic acid and/or its ester in an amount of 20 mol % or less. Examples of the dicarboxylic acids other than terephthalic acid usable in the present invention include isophthahic acid, phthalic acid, 2-methylterephthalic acid, naphthalenedicarboxylic acid, biphenyldicarboxylic acid, tetralindicarboxyic acid, succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanediacarboxylic acid, tricyclodecanedicarboxylic acid, pentacylcododecanedicarboxylic acid, isophoronedicarboxylic acid, 3,9-bis(2-carboxyethyl)-2,4,8,10-tetraoxaspiro[5.5]undecane, trimellitic acid, trimesic acid, pyromellitic acid, and tricarballylic acid, although not limited thereto.

Also, in the present invention, the glycol component may contain a glycol other than SPG represented by Formula I and ethylene glycol in an amount of 10 mol % or less. Examples of such a glycol include, but not limited to, an aliphatic diol such as trimethylene glycol, 1,4-butanediol, 1,5-pentanediol, 1,6-hexanediol, diethylene glycol, triethylene glycol, propylene glycol and neopentyl glycol; a polyalkylene glycol such as polyethylene glycol, polypropylene glycol and polybutylene glycol; a three or more valent polyhydric alcohol such as glycerol, trimethylol propane and pentaerythritol; an alicyclic diol such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, 5-methylol-5-ethyl-2-(1,1-dimehyl-2-hydroxyethyl)-1,3-dioxane and pentacylcododecanedimethanol; an alkylene oxide adduct of a bisphenol such as 4,4'(1-methylethylidene) bisphenol, methylenebisphenol (bisphenol F), 4,4'-cyclohexylidenebisphenol (bisphenol Z) and 4,4'-sulfonylbisphenol (bisphenol S); and an alkylene oxide adduct of an aromatic dihydroxy compound such as hydroquinone, resorcin, 4,4'-dihydroxybiphenyl, 4,4'-dihydroxydiphenyl ether and 4,4'-dihydroxydiphenyl benzophenone.

The polyester resin of the present invention may be produced by any suitable known method without particular limitations. For example, the polyester resin may bye produced by transesterification or direct esterification which may be conducted in either a melt polymerization method or a solution polymerization method. As a transesterification catalyst, an esterification catalyst, an etherification inhibitor, a polymerization catalyst, various stabilizers such as a heat stabilizer and a light stabilizer and a polymerization modifier, those known in the polymer art are used. Examples of the transesterification catalyst include compounds of manganese, cobalt, zinc, titanium, and calcium. Examples of the esterification catalyst include compounds of manganese, cobalt, zinc, titanium, and calcium. Examples of the etherification inhibitor include amine compounds.

Examples of the polycondensation catalyst include compounds of germanium, antimony, tin, and titanium. Examples of the heat stabilizer include various phosphorus compounds such as phosphoric acid, phosphorous acid and phenylphosphonic acid. In addition, various additives such as a light stabilizer, an anitistatic agent, a lubricant, an antioxidant and a mold-release agent may be used in the production of the polyester resin.

SPG may be added at any stage of producing the polyester resin. For example, SPG may be added after completion of the esterification reaction or transesterification reaction. In the direct esterification method, water may be used to keep the slurry condition stable.

In the present invention, the properties of the polyester resin were measured by the following methods.

(1) Intrinsic Viscosity (IV)

The intrinsic viscosity was measured using an Ubbelohde viscometer at a constant temperature of 25° C. in a 6:4 by mass mixed solvent of phenol and 1,1,2,2-tetrachloroethane.

(2) Melt Viscosity

The melt viscosity was measured using Capirograph 1C available from Toyo Seiki Co., Ltd. under the following conditions.

Measuring temperature: 240° C.;
  Preheating time: 1 min
  Nozzle diameter: 1 mm
  Nozzle length: 10 mm
  Shear rate: 100 s$^{-1}$ (3) Molecular Weight Distribution (Mw/Mn)

Measuring device: gel permeation chromatograph (GPC) "Shodex- 11" available from Showa Denko Co., Ltd.
  Solvent: 2 mmol/L sodium trifluoroacetate in hexafluoro-2-propanol
  Specimen concentration: about 0.05 wt %
  Detector: Refractive Index Detector (RI)
  Calibration: Polymethyl methacrylate (PMMA) standard (4) Drop-weight Test Measuring device: Drop-weight tester available from Parker Corporation
  Environmental conditions: 25° C. and 60±20% relative humidity
  Shape of weight: Semispherical head of 20 mm diameter
  Dropping speed: 10 m/s
  Impact energy: 300 J The energy absorbed when the weight penetrated through the test specimen was measured under the above conditions according to ASTM D3029. Using the measured result, the drop-weight breaking strength was calculated from the following formula:

Drop-weight breaking strength=(absorbed energy)/(thickness of test specimen)

(5) Glass Transition Temperature and Cooling Crystallization Exotherm Peak

Using DSC/TA-50WS available from Shimadzu Corporation, about 10 mg of a sample polymer were placed in an unsealed aluminum container and heated at a temperature rise rate of 20° C./min in a nitrogen gas flow of a flow rate of 30 mL/min to measure the glass transition temperature (Tg). The temperature at the center of the discontinuous region of the base line on the DSC curve, i.e., the temperature at which the specific heat is reduced to half was employed as Tg. After the measurement of Tg, the sample polymer was kept at 280° C. for one minute, and then, cooled at a temperature drop rate of 10° C./min. The cooling crystallization exotherm peak (hereinafter referred to merely as "ΔHc") was determined as the area of an exotherm peak which appeared during the cooling.

The polyester resin of the present invention has an intrinsic viscosity of 0.4 to 1.5 dL/g, preferably 0.5 to 1.0 dL/g, more preferably 0.6 to 0.8 dL/g. When the intrinsic viscosity is 0.4 dL/g or higher, the resultant molded article is excellent in strength, and when the intrinsic viscosity is 1.5 dL/g or lower, the polyester resin is excellent in moldability.

The polyester resin of the present invention has a melt viscosity of 700 to 5,000 Pa·s when measured at 240° C. under a shear rate of 100 s$^{-1}$. When the melt viscosity lies within the above range, the polyester resin is excellent in moldability.

The polyester resin of the present invention has a molecular weight distribution of 2.5 to 12.0. When the molecular weight distribution lies within the above-specified range, the polyester resin is excellent in moldability. The molecular weight distribution means a ratio (Mw/Mn) of weight-average molecular weight (Mw) to number-average molecular weight (Mn). The molecular weight distribution can be regulated within the range of 2.5 to 12.0 by appropriately selecting the addition amount and addition timing of SPG, the molecular weight of the polyester, the polymerization temperature and the additives.

The impact strength of the polyester resin of the present invention is expressed by the drop-weight breaking strength. The drop-weight breaking strength is 10 kJ/m or higher when vertically applying an impact energy of 300 J to a polyester sheet made of the polyester resin by dropping a weight having a semispherical head of 20 mm diameter. When the drop-weight breaking strength is 10 kJ/m or higher, the resultant molded article shows a practically effective impact strength.

The polyester resin of the present invention has a glass transition temperature of 90° C. or higher and a cooling crystallization exotherm peak of 5 J/g or lower when measured by a differential scanning calorimeter (DSC). When the glass transition temperature is 90° C. or higher, the polyester resin exhibits a practically effective heat resistance. Also, when the cooling crystallization exotherm peak is 5 J/g or lower, the polyester resin is excellent in transparency, moldability and fabrication qualities.

The polyester resin of the present invention is formed into shaped article required to have a high transparency, for example, formed into non-stretched or slightly stretched single- or multi-layer sheets by T-die extrusion or co-extrusion, which may be fabricated into stretched films or slightly stretched deep-drawn containers; and thin-wall hollow containers having a body thickness of 0.1 to 2 mm by non-stretch direct blow molding or stretch blow molding.

The sheets obtained from the polyester resin of the present invention may be used in various applications. In the building material use, the sheets may be used as exterior materials such as illumination boards for vending machines, showcases, outdoor sign boards and carports; covers for various industrial machines; windscreens; and factory partition boards. The application to home electric appliances includes electric lamp covers, front screen panels for projection TV, back light-guiding plates and front panels for game devices. In the food application, the sheets may be used as transparent containers to be pasteurized or sterilized, heat-resistant transparent drinking cups, food trays, and lids for lunch box to be re-heated. Further, the polyester resin sheets are applicable to clear cases and clear boxes fabricated by folding, blisters and export products of a long term shipping beyond the equator. The sheets or hollow containers obtained from the polyester resin of the present invention are also used, for example, as packaging or wrapping materials.

The foamed article of the present invention is produced by foaming the polyester resin and then stabilizing the foamed structure. The method for foaming the polyester resin is not particularly limited and may be mainly performed by heating a resin impregnated with a foaming agent, or by kneading a foaming agent into a molten resin. The polyester resin may be foam-molded by an in-mold foaming method or a foaming extrusion method, though not limited thereto. The "in-mold foaming" means a method of foaming the resin into beads and then molding in a mold under heating to produce blocks.

Preferably, the foamed article of the present invention is produced by melting the resin under high temperatures and high pressures, mixing a foaming agent with the molten resin, and extruding the molten resin to a low-pressure region for foaming. Examples of the foaming agent include inert gases, saturated aliphatic hydrocarbons, aromatic hydrocarbons, halogenated hydrocarbons, ethers and ketones. These foaming agents may be used alone or in combination of two or more. Specific examples of the foaming agent include carbon dioxide gas, nitrogen gas, methane, ethane, n-butane, isopentane, neopentane, n-hexane, 2-methylpentane, 3-methylpentane, 2,2-dimethylbutane, 2,3-dimethylbutane, methylcyclopropane, ethylcyclobutane, 1,1,2-trimethylcyclopropane, benzene, trichloromonofluoromethane, trichlorotrifluoroethaane, dichlorotetrafluoroethane, dimethyl ether, 2-ethoxyethanol, acetone, ethyl methyl ketone and acetyl ketone. The foaming agent is used in an amount of 1 to 20 parts by weight based on 100 parts by weight of the polyester resin. When the amount of the foaming agent is less than 1 part by weight, the polyester resin is insufficiently foamed, resulting in poor cost performance and foamed articles of poor heat insulation. When the amount of the foaming agent is more than 20 parts by weight, it is not possible to achieve stable gas seal at the dies, resulting in production of poor foamed article.

In general, the extrusion foaming is conducted by mixing a foaming agent with a molten resin, and cooling the molten resin to a temperature at which the viscosity of the resin reaches a suitable level for foaming. Therefore, it is desirable to sufficiently melt-knead the polyester resin and the foaming agent at a high rotation speed. In addition, in view of enhancing the cooling efficiency, the kneaded product is preferred to be extruded at a low screw rotation speed to control the shear-heating as low as possible. If the melt-kneading and the cooling for foaming are performed in the same extruder, the extruder is required to operate at a low screw rotation speed for ensuring a sufficient cooling of the resin. As a result, the melt-kneading of the polyester resin and the foaming agent tends to become insufficient, thereby causing poor foaming and poor productivity due to low extrusion amount. Accordingly, in the present invention, the melt-kneading of the molten polyester resin with the foaming agent and the cooling prior to extruding the resin into a low-pressure region for foaming are preferred to be separately conducted in respective one or more extruders. The configurations or types of the extruders are not particularly restricted.

In the production of the foamed article of the present invention, the polyester resin may be added with a suitable additive, for example, a nucleating agent such as talc, a cross-linking agent such as ionomer, an inorganic filler including fibers, a flame retardant, an antistatic agent, an antioxidant and a colorant.

The foamed article of the present invention obtained by the above process preferably hasia thickness of 0.2 to 7 mm. When the thickness is less than 0.2 mm, the heat insulation, the cushioning property and the mechanical strength are possibly insufficient. When the thickness is more than 7 mm, the fabrication qualities such as thermoforming and bag making are possibly poor.

The present invention will be described in more details by reference to the following examples. However, it should be noted that the following examples are illustrative and not intended to limit the invention thereto.

In the following examples and comparative examples, dimethyl terephthalate is abbreviated to "DMT", dimethyl 2,6-naphthalenedicarboxylate to "NDCM", pyromellitic acid to "PMDA", ethylene glycol to "EG", neopentyl glycol to "NPG", 1,4-cyclohexanedimethanol to "CHDM", and 3,9-bis(1,1-dimethyl-2-hydroxyethyl)-2,4,8,10-tetraoxaspiro[5.5]undecane to "SPG".

EXAMPLE 1

(1) Production of Resin

A mixture of 13,313 g (69 mol) of DMT, 7,191 g (116 mol) of EG and 2,294 g (7.5 mol) of SPG was heated to 200° C. in nitrogen atmosphere in the presence of manganese acetate tetrahydrate in an amount of 0.03 mol based on 100 mol of DMT to conduct a transesterification reaction.

After the amount of methanol distilled reached 90% or higher the stoichiometric amount, 0.01 mol of antimony (III) oxide and 0.06 mol of triphenyl phosphate (hereinafter referred to merely as "TPP"), each based on 100 mol of DMT, were added to the reaction mixture. The temperature was gradually raised and the pressure was gradually reduced to finally reach 280° C. and 0.1 kPa or lower to conduct a polymerization. The polymerization was terminated when the reaction product reached a predetermined melt viscosity, thereby obtaining a polyester containing SPG unit in an amount of 9 mol % (SPG9). The content of SPG unit in the polymer was measured by $^1$H-NMR (400 MHz).

(2) Preparation of Injection-molded Article

The polyester thus obtained was vacuum-dried under predetermined conditions and injection-molded under predetermined conditions using a screw injection molding machine (screw diameter: 32 mmφ; mold clamping force: 9.8 kN) to prepare test specimens of 3.2 mm thick. The results of measurement for various properties of the injection-molded test specimens are shown in Table 1.

(3) Preparation of Sheet

The polyester was vacuum-dried under predetermined conditions and extruded under predetermined conditions into a sheet of about 0.8 mm thick. The test results are shown in Table 2.

EXAMPLE 2

(1) Production of Resin

A polyester composed of a glycol component containing 20 mol % of SPG unit and 80 mol % of ethylene glycol unit, and a dicarboxylic acid component containing 100 mol % of terephthahic acid unit (SPG20) was prepared in the same manner as in Example 1.

(2) Preparation of Injection-molded Article

The polyester thus obtained was vacuum-dried under predetermined conditions and injection-molded under predetermined conditions using a screw injection molding machine (screw diameter: 32 mmφ; mold clamping force: 9.8 kN) to prepare test specimens of 3.2 mm thick. The results of measurement for various properties of the injection-molded test specimens are shown in Table 1.

(3) Preparation of Sheet

The polyester was vacuum-dried under predetermined conditions and extruded under predetermined conditions into a sheet of about 0.8 mm thick. The test results are shown in Table 2.

EXAMPLE 3

(1) Production of Resin

A polyester composed of a glycol component containing 50 mol % of SPG unit and 50 mol % of ethylene glycol unit, and a dicarboxylic acid component containing 100 mol % of terephthalic acid unit (SPG50) was prepared in the same manner as in Example 1.

(2) Preparation of Injection-molded Article

The polyester thus obtained was vacuum-dried under predetermined conditions and injection-molded under predetermined conditions using a screw injection molding machine (screw diameter: 32 mm$\phi$; mold clamping force: 9.8 kN) to prepare test specimens of 3.2 mm thick. The results of measurement for various properties of the injection-molded test specimens are shown in Table 1.

(3) Preparation of Sheet

The polyester was vacuum-dried under predetermined conditions and extruded under predetermined conditions into a sheet of about 0.8 mm thick. The test results are shown in Table 2.

EXAMPLE 4

(1) Production of Resin

A polyester composed of a glycol component containing 5 mol % of SPG unit and 95 mol % of ethylene glycol unit, and a dicarboxylic acid component containing 90 mol % of terephthalic acid unit and 10 mol % of naphthalenedicarboxylic acid unit (SPG5N10) was prepared in the same manner as in Example 1.

(2) Preparation of Injection-molded Article

The polyester thus obtained was vacuum-dried under predetermined conditions and injection-molded under predetermined conditions using a screw injection molding machine (screw diameter: 32 mm$\phi$; mold clamping force: 9.8 kN) to prepare test specimens of 3.2 mm thick. The results of measurement for various properties of the injection-molded test specimens are shown in Table 1.

(3) Preparation of Sheet

The polyester was vacuum-dried under predetermined conditions and extruded under predetermined conditions into a sheet of about 0.8 mm thick. The test results are shown in Table 2.

The injection-molded articles and sheets were evaluated by the following methods.

1. Evaluation of Injection-molded Article (1) Tensile properties

Measured according to ASTM D638.

(2) Flexural Properties

Measured according to ASTM D790.

(3) Deflection Temperature Under Load

Measured according to ASTM D648 under a bending stress of 451 kPa.

(4) Drop-weight Impact Test

Measuring device: Drop-weight impact tester available from Parker Corporation

Environmental conditions: 25° C. and 60±20% relative humidity

Shape of weight: Semi-spherical head having a 20 mm diameter

Dropping speed: 10 m/s

Impact energy: 300 J

The energy absorbed when the weight penetrated through the test specimen was measure under the above conditions according to ASTM D3029. Using the measured result, the drop-weight breaking strength was calculated from the following formula:

$$\text{Drop-weight breaking strength} = (\text{absorbed energy})/(\text{thickness of test specimen})$$

2. Evaluation of Sheet (1) Moldability

The molded sheet was cut into square test specimens of 100 mm in length (extrusion direction)×100 mm in width (width direction). The thicknesses of the test specimen were measured at ten points arbitrarily selected. The moldability was ranked "good" when the standard deviation was within 5% of the average thickness, and "poor" when exceeding 5%. Further, the resin which was difficult to extrude into sheet was also ranked "poor".

(2) Heat Resistance

The sheet was cut into square test specimens of 100 mm in length (extrusion direction)×100 mm in width (width direction). The test specimens were heated at 85° C. for 30 minutes in an oven. The test specimens exhibiting a shrinkage of more than 10% in each of lengthwise and widthwise directions were ranked "poor" in the heat resistance.

(3) Drop-weight Impact Test

Measuring device: falling weight impact tester available from Parker Corporation Environmental conditions: temperature: 25° C.; relative humidity: 60±20%

Shape of weight: semi-spherical head having a diameter of 20 mm

Falling weight impact velocity: 10 m/s

Impact energy: 300 J

The energy absorbed when the weight penetrated through the test specimen was measured under the above conditions according to ASTM D3029. Using the measured result, the drop-weight breaking strength was calculated from the following formula:

$$\text{Drop-weight breaking strength} = (\text{absorbed energy})/(\text{thickness of test specimen})$$

Evaluation Standards

A: >40 kJ/m

B: 10 to 40 kJ/m

C: <10 kJ/m (4) Punching Quality

Pressing machine: TORC-PAC PRESS

Punching diameter: 19 mm$\phi$

Blade: Thomson-blade

The punching test was conducted under the above conditions to evaluate the punching quality of each test specimen according to the following standards:

A: completely punched, and no burr on cut surface

B: punchable, but burrs were present on cut surface

C: not punchable

TABLE 1

|  | Ex. 1 | Ex. 2 | Ex. 3 | Ex. 4 |
|---|---|---|---|---|
| Polyester Resin Monomer dicarboxylic acid component (molar ratio) | | | | |
| DMT | 100 | 100 | 100 | — |
| DMT/NDCM | — | — | — | 90/10 |
| glycol component (molar ratio) | | | | |
| SPG/EG | 9/91 | 20/80 | 50/50 | 5/95 |
| Tg (° C.) | 92 | 97 | 112 | 92 |
| Δ Hc (J/g) | 4.0 | 0 | 0 | 0 |
| IV (dL/g) | 0.75 | 0.75 | 0.70 | 0.70 |
| Molecular weight distribution | 3.0 | 4.0 | 6.3 | 3.0 |
| Melt viscosity (Pa · s) | 800 | 1500 | 2500 | 850 |
| Evaluation of injection-molded article | | | | |
| Deflection temperature under load (° C.) | 81 | 86 | 101 | 82 |
| Tensile strength (MPa) | 56 | 54 | 58 | 56 |
| Elongation at break (%) | 200 | 180 | 100 | 220 |
| Flexural strength (MPa) | 88 | 86 | 86 | 87 |
| Flexural modulus (GPa) | 2.4 | 2.7 | 2.5 | 2.5 |
| Drop-weight breaking strength (kJ/m) | 55 | 58 | 40 | 56 |

TABLE 2

|  | Ex. 1 | Ex. 2 | Ex. 3 | Ex. 4 |
|---|---|---|---|---|
| Polyester Resin Monomer dicarboxylic acid component (molar ratio) | | | | |
| DMT | 100 | 100 | 100 | — |
| DMT/NDCM | — | — | — | 90/10 |
| glycol component (molar ratio) | | | | |
| SPG/EG | 9/91 | 20/80 | 50/50 | 5/95 |
| Tg (° C.) | 92 | 97 | 112 | 92 |
| Δ Hc (J/g) | 4 | 0 | 0 | 0 |
| IV (dL/g) | 0.75 | 0.75 | 0.70 | 0.7 |
| Molecular weight distribution | 3.0 | 4.0 | 6.3 | 3.0 |
| Melt viscosity (Pa · s) | 800 | 1500 | 2500 | 850 |
| Evaluation of sheet | | | | |
| Moldability | good | good | good | good |
| Heat resistance | good | good | good | good |
| Impact strength | A | A | A | A |
| Punching quality | A | A | A | A |

Comparative Example 1

(1) Production of Resin

A polyester composed of a glycol component containing 3 mol % of SPG unit and 97 mol % of ethylene glycol unit, and a dicarboxylic acid component containing 100 mol % of terephthalic acid unit (SPG3) was prepared in the same manner as in Example 1.

(2) Preparation of Injection-molded Article

The polyester thus obtained was vacuum-dried under predetermined conditions and injection-molded under predetermined conditions using a screw injection molding machine (screw diameter: 32 mmφ; mold clamping force: 9.8 kN) to prepare test specimens of 3.2 mm thick. The results of measurement for various properties of the injection-molded test specimens are shown in Table 3.

(3) Preparation of Sheet

The polyester was vacuum-dried under predetermined conditions and extruded under predetermined conditions into a sheet of about 0.8 mm thick. The test results are shown in Table 4.

Comparative Example 2

(1) Polyester Resin

PETG (33 mol % cyclohexanedimethanol-modified PET available from Eastman Kodak Company as the trade name of EASTAR PETG 6763) was used as the polyester resin.

(2) Preparation of Injection-molded Article

The polyester was vacuum-dried under predetermined conditions and injection-molded under predetermined conditions using a screw injection molding machine (screw diameter: 32 mmφ; mold clamping force: 9.8 kN) to prepare test specimens of 3.2 mm thick. The results of measurement for various properties of the injection-molded test specimens are shown in Table 3.

(3) Preparation of Sheet

The polyester was vacuum-dried under predetermined conditions and extruded under predetermined conditions into a sheet of about 0.8 mm thick. The test results are shown in Table 4.

Comparative Example 3

(1) Production of Resin

A polyester composed of a glycol component containing 45 mol % of SPG unit and 55 mol % of ethylene glycol unit, and a dicarboxylic acid component containing 100 mol % of terephthalic acid unit (SPG45) was prepared in the same manner as in Example 1.

(2) Preparation of Injection-molded Article

The polyester thus obtained was vacuum-dried under predetermined conditions and injection-molded under predetermined conditions using a screw injection molding machine (screw diameter: 32 mmφ; mold clamping force: 9.8 kN) to prepare test specimens of 3.2 mm thick. The results of measurement for various properties of the injection-molded test specimens are shown in Table 3.

(3) Preparation of Sheet

The polyester was vacuum-dried under predetermined conditions and extruded under predetermined conditions into a sheet of about 0.8 mm thick. The test results are shown in Table 4.

Comparative Example 4

(1) Production of Resin

A polyester composed of a glycol component containing 70 mol % of SPG unit and 30 mol % of ethylene glycol unit, and a dicarboxylic acid component containing 100 mol % of terephthalic acid unit (SPG70) was prepared in the same manner as in Example 1.

(2) Preparation of Injection-molded Product

The polyester thus obtained was vacuum-dried under predetermined conditions and injection-molded under predetermined conditions using a screw injection molding machine (screw diameter: 32 mmφ; mold clamping force: 9.8 kN) to prepare test specimens of 3.2 mm thick. The results of measurement for various properties of the injection-molded test specimens are shown in Table 3.

(3) Preparation of Sheet

The polyester was vacuum-dried under predetermined conditions and extruded under predetermined conditions into a sheet of about 0.8 mm thick. The test results are shown in Table 4.

Comparative Example 5

(1) Production of Resin

A polyester composed of a glycol component containing 10 mol % of SPG unit and 90 mol % of ethylene glycol unit, and a dicarboxylic acid component containing 100 mol % of terephthahic acid unit (SPG10) was prepared in the same manner as in Example 1.

(2) Preparation of Injection-molded Article

The polyester thus obtained was vacuum-dried under predetermined conditions and injection-molded under predetermined conditions using a screw injection molding machine (screw diameter: 32 mmφ; mold clamping force: 9.8 kN) to prepare test specimens of 3.2 mm thick. The results of measurement for various properties of the injection-molded test specimens are shown in Table 3.

(3) Preparation of Sheet

The polyester was vacuum-dried under predetermined conditions and extruded under predetermined conditions into a sheet of about 0.8 mm thick. The test results are shown in Table 4.

TABLE 3

|  | Com. Ex. 1 | Com. Ex. 2 | Com. Ex. 3 | Com. Ex. 4 | Com. Ex. 5 |
|---|---|---|---|---|---|
| Polyester Resin Monomer dicarboxylic acid component (molar ratio) | | | | | |
| DMT | 100 | 100 | 100 | 100 | 100 |
| glycol component (molar ratio) | | | | | |
| SPG/EG | 3/97 | — | 45/55 | 70/30 | 10/90 |
| CHDM/EG | — | 33/67 | — | — | — |
| Tg (° C.) | 85 | 83 | 100 | 125 | 92 |
| Δ Hc (J/g) | 38 | 0 | 0 | 0 | 3.0 |
| IV (dL/g) | 0.65 | 0.75 | 0.35 | 0.75 | 0.58 |
| Molecular weight distribution | 2.2 | 2.7 | 2.6 | 13.5 | 2.3 |
| Melt viscosity (Pa · s) | 500 | 1000 | 550 | 6200 | 600 |
| Evaluation of injection-molded article | | | | | |
| Deflection temperature under load (° C.) | 75 | 73 | 91 | 112 | 82 |
| Tensile strength (MPa) | 56 | 44 | 58 | 56 | 50 |
| Elongation at break (%) | 200 | 240 | 4 | 9 | 160 |
| Flexural strength (MPa) | 84 | 68 | 86 | 67 | 81 |
| Flexural modulus (GPa) | 2.4 | 1.9 | 2.5 | 2.1 | 1.9 |
| Drop-weight breaking strength (kJ/m) | 55 | 44 | 4 | 5 | 6 |

TABLE 4

|  | Com. Ex. 1 | Com. Ex. 2 | Com. Ex. 3 | Com. Ex. 4 | Com. Ex. 5 |
|---|---|---|---|---|---|
| Polyester Resin Monomer dicarboxylic acid component (molar ratio) | | | | | |
| DMT | 100 | 100 | 100 | 100 | 100 |
| glycol component (molar ratio) | | | | | |
| SPG/EG | 3/97 | — | 45/55 | 70/30 | 10/90 |
| CHDM/EG | — | 33/67 | — | — | — |
| Tg (° C.) | 85 | 83 | 100 | 125 | 92 |
| Δ Hc (J/g) | 38 | 0 | 0 | 0 | 3.0 |
| IV (dL/g) | 0.65 | 0.75 | 0.35 | 0.75 | 0.58 |
| Molecular weight distribution | 2.2 | 2.7 | 2.6 | 13.5 | 2.3 |
| Melt viscosity (Pa · s) | 500 | 1000 | 550 | 6200 | 600 |
| Evaluation of sheet | | | | | |
| Moldability | poor | good | poor | poor | poor |
| Heat resistance | poor | poor | good | good | good |
| Impact strength | A | B | C | C | C |
| Punching quality | C | A | B | C | C |

EXAMPLES 5 TO 6

Comparative Examples 6 to 9

(1) Production of bottle

Respective resins shown in Tables 5 and 6 were molded into bottles.

Molding Conditions

Preform: 30 g

Injection molding machine: M200 available from Meiki Seisakusho Co., Ltd.

Bottle: 330 mL capacity; pressure-proof type; petaloid bottom

Blow molding machine: LB-01 available from Krupp Corpoplast Maschinenbau GmbH

In COMPARATIVE EXAMPLE 6, polyethylene terephthalate (RT543 available from Nippon Unipet Co., Ltd.) having an intrinsic viscosity of 0.75 dL/g was used.

The blow moldability of each resin was evaluated according to the following standards:

Good: substantially no uneven thickness

Poor: uneven thickness along circumferential direction (2) Falling Test

A bottle filled with water was kept at 5° C. overnight, and then dropped by gravity with its bottom downward (vertical drop). Fifteen bottles per each sample were subjected to the falling test, and evaluated according to the following standards:

Good: no change occurred

Poor: cracks or water leakage occurred (3) Hot Water Filling Test

A bottle filled with hot water of 85±1° C. was allowed to stand overnight, and the heat resistance was evaluated based on retention of height and capacity according to the following standards:

Height Retention:

Good: 99% or higher

Poor: less than 99%

Capacity Retention:

Good: 98.5% or larger

Poor: less than 98.5%

The results are shown in Tables 5 and 6.

TABLE 5

|  | Ex. 5 | Ex. 6 |
|---|---|---|
| Polyester Resin | | |
| Monomer | | |
| dicarboxylic acid component (molar ratio) | | |
| DMT | — | 100 |
| DMT/NDCM | 95/5 | — |
| glycol component (molar ratio) | | |
| SPG/EG | 25/75 | 50/50 |
| Tg (° C.) | 105 | 112 |
| Δ Hc (J/g) | 0 | 0 |
| IV (dL/g) | 0.70 | 0.7 |
| Molecular weight distribution | 4.0 | 6.3 |
| Melt viscosity (Pa · s) | 2000 | 2500 |
| Evaluation of bottle | | |
| Blow moldability | good | good |
| Heat resistance | | |
| retention of height | good | good |
| retention of capacity | good | good |
| Falling test | good | good |

TABLE 6

|  | Com. Ex. 6 | Com. Ex. 7 | Com. Ex. 8 | Com. Ex. 9 |
|---|---|---|---|---|
| Polyester Resin | | | | |
| Monomer | | | | |
| dicarboxylic acid component (molar ratio) | | | | |
| DMT | 100 | 100 | 100 | 100 |
| glycol component (molar ratio) | | | | |
| SPG/EG | 0/100 | 3/97 | 45/55 | 70/30 |
| Tg (° C.) | 82 | 83 | 100 | 125 |
| Δ Hc (J/g) | 38 | 31 | 0 | 0 |
| IV (J/g) | 0.75 | 0.65 | 0.35 | 0.70 |
| Molecular weight distribution | 2.4 | 2.2 | 2.6 | 13.5 |
| Melt viscosity (Pa · s) | 480 | 500 | 550 | 6200 |
| Evaluation of bottle | | | | |
| Blow moldability | good | poor | good | poor |
| Heat resistance | | | | |
| retention of height | poor | poor | good | good |
| retention of capacity | poor | poor | good | good |
| Falling test | good | good | poor | poor |

EXAMPLES 7 TO 8

Comparative Examples 10 to 13

(1) Extrusion of Sheet

DMT, DMT-NDCM mixture or DMT-PMDA mixture as a dicarboxylic component, and EG, SPG-EG mixture, CHDM-EG mixture or NPG-EG mixture as a diol component were polycondensed in respective molar ratios shown in Tables 7 and 8 to produce a polyester resin. Then, 0.05 part by weight of talc as a nucleating agent was added to 100 parts by weight of the polyester resin. The resultant resin material was fed into a first extruder for melt-kneading, and heated, melted and kneaded therein. Then, isobutane as a foaming agent was fed under pressure into the extruder in an amount of 10 parts by weight based on 100 parts by weight of the polyester resin, and the mixture was melt-kneaded. The melt-kneaded product was fed to a second extruder, and then extruded through a ring die at a tip end of the extruder at temperatures shown in Tables 7 and 8. The extruded tubular foamed article was drawn over a mandrel for cooling, and cut along the extrusion direction to obtain a foamed sheet. The moldability of the foamed sheet and properties of the resin are shown in Tables 7 and 8. The properties of the polymers were measured by the following methods. In Comparative Example 13, the foam extrusion was difficult because of the formation of three-dimensional polymer (gelation).

(2) Heat Resistance Test

The foamed sheet was cut into square test specimens of 100 mm in length (extrusion direction)×100 mm in width (width direction). The test specimens were heated at 85° C. for 30 minutes in an oven. The test specimens exhibiting a shrinkage of more than 10% in each of lengthwise and widthwise directions were ranked "poor" in the heat resistance.

(3) Cell Structure

The foamed sheet obtained in each of the examples and comparative examples was cut into square pieces of 25 mm in length and 25 mm in width without changing the thickness. Twenty square pieces were stacked in the thickness direction to prepare a sample for measuring a closed cell content (%). First, an apparent volume Va ($cm^3$) of the sample was determined from the outer dimensions. Then, an actual volume Vx ($cm^3$) of the sample was measured by an air-pycnometer method according to ASTM D2856. Based on the obtained Va and Vx, the open cell content Fo (%) was calculated from the following formula:

$$Fo=(Va-Vx)/Va\times100.$$

The closed cell content Fc (%) was calculated from the following formula:

$$Fc=100-Fo.$$

The cell structure was evaluated according to the following criteria:

A: uniform and extremely fine cells and a closed cell content Fc of 85% or higher
B: uniform and fine cells and a closed cell content Fc of 80% or higher but less than 85%
C: slightly non-uniform cells and a closed cell content Fc of 50% or higher but less than 80%

Both the foamed sheets obtained in Examples 7 and 8 showed a high closed cell content and, therefore, were successfully formed into a well-angulated tray by a vacuum molding method. The results are shown in Tables 7 and 8.

TABLE 7

|  | Ex. 7 | Ex. 8 |
|---|---|---|
| Polyester Resin | | |
| Monomer | | |
| dicarboxylic acid component (molar ratio) | | |
| DMT | 100 | 100 |
| glycol component (molar ratio) | | |
| SPG/EG | 45/55 | 20/80 |
| Tg (° C.) | 110 | 95 |
| IV (dL/g) | 0.70 | 0.75 |
| Melt viscosity (Pa · s) | 2400 | 2500 |
| Evaluation of foamed sheet | | |
| Extrusion temperature (° C.) | 190 | 180 |
| Cell structure | A | A |
| Heat resistance | good | good |

TABLE 8

|  | Com. Ex. 11 | Com. Ex. 12 | Com. Ex. 13 | Com. Ex. 14 |
|---|---|---|---|---|
| Polyester Resin Monomer dicarboxylic acid component (molar ratio) |  |  |  |  |
| DMT | 100 | — | 100 | — |
| DMT/NDCM | — | 25/75 | — | — |
| DMT/PMDA | — | — | — | 95/05 |
| glycol component (molar ratio) |  |  |  |  |
| CHDM/EG | 33/67 | — | — | — |
| EG | — | 100 | — | 100 |
| NPG/EG | — | — | 30/70 | — |
| Tg (° C.) | 81 | 110 | 75 | — |
| IV (dL/g) | 0.75 | 0.80 | 0.80 | — |
| Melt viscosity (Pa · s) | 1000 | 1100 | 1000 | — |
| Evaluation of foamed sheet |  |  |  |  |
| Extrusion temperature (° C.) | 170 | 180 | 170 | — |
| Cell structure | B | C | C | — |
| Heat resistance | poor | good | poor | — |

The polyester resin of the present invention is excellent in heat resistance, transparency, mechanical properties, moldability and fabrication qualities and, therefore, suitable as resin materials for films, sheets, hollow containers and foamed articles. Molded articles produced from the polyester resin of the present invention are industrially useful as food packaging materials, building materials or the like.

What is claimed is:

1. A polyester resin produced by polymerizing a monomer mixture comprising a glycol component containing 5 to 60 mol % of a spiroglycol represented by Formula I:

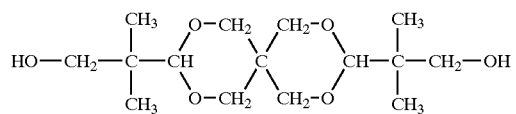

and 30 to 95 mol % of ethylene glycol, and a dicarboxylic acid component containing 80 to 100 mol % of terephthalic acid and/or an ester thereof; the polyester resin satisfying the following requirements (1) to (4):

(1) an intrinsic viscosity of 0.4 to 1.5 dL/g when measured at 25° C. in a 6/4 by mass mixed solvent of phenol/1,1,2,2-tetrachloroethane;

(2) a melt viscosity of 700 to 5,000 Pa·s when measured at 240° C. under a shear rate of 100 $s^{-1}$;

(3) a molecular weight distribution of 2.5 to 12.0; and (4) a glass transition temperature of 90° C. or higher, and a cooling crystallization exotherm peak of 5 J/g or lower, when measured by a differential scanning calorimeter.

2. The polyester resin according to claim 1, wherein the glycol component contains 20 to 40 mol % of the spiroglycol represented by Formula I and 50 to 80 mol % of ethylene glycol.

3. The polyester resin according to claim 1, wherein the dicarboxylic acid component contains 95 to 100 mol % of terephthalic acid and/or an ester thereof.

4. The polyester resin according to claim 1, wherein the glycol component contains 15 to 60 mol % of the spiroglycol represented by Formula I, and 40 to 85 mol % of ethylene glycol.

5. The polyester resin according to claim 1, which is made into a polyester film or sheet, the polyester film or sheet having a drop-weight breaking strength of 10 kJ/m or higher when vertically applying an impact energy of 300 J by dropping a semispherical weight of 20 mm diameter on the polyester film or sheet.

6. The polyester resin according to claim 1, which is made into a hollow container.

7. A process for producing a foamed polyester sheet, comprising:

melt-kneading the polyester resin according to claim 4 in the presence of a foaming agent in an extruder; and extruding the polyester resin into a low pressure region.

8. A foamed polyester sheet produced by the process according to claim 7.

9. The foamed polyester sheet according to claim 8, wherein the sheet has a thickness of 0.2 to 7 mm and a closed cell content of at least 50%.

10. A molded article made of the polyester resin of claim 1.

11. The polyester resin according to claim 4, wherein the dicarboxylic acid component contains 90 to 100 mol % of terephthalic acid and/or an ester thereof.

12. A foamed polyester article, made of the polyester resin of claim 11.

13. A polyester resin according to claim 1, wherein the glycol component includes up to 10 mol % of an additional glycol other than said spiroglycol represented by Formula I and ethylene glycol.

* * * * *